United States Patent
Kurita et al.

(10) Patent No.: US 7,095,587 B2
(45) Date of Patent: Aug. 22, 2006

(54) MAGNETIC HEAD SLIDER AND MAGNET DISK APPARATUS

(75) Inventors: Masayuki Kurita, Chiyoda (JP); Toshiya Shiramatsu, Chiyoda (JP); Hideaki Tanaka, Odawara (JP); Sunao Yonekawa, Odawara (JP); Koji Miyake, Odawara (JP); Hidekazu Kohira, Ninomiya (JP); Mikio Tokuyama, Tsuchiura (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 385 days.

(21) Appl. No.: 10/659,372

(22) Filed: Sep. 11, 2003

(65) Prior Publication Data

US 2005/0024775 A1 Feb. 3, 2005

(30) Foreign Application Priority Data

Aug. 1, 2003 (JP) .............................. 2003-205235

(51) Int. Cl.
*G11B 5/127* (2006.01)
(52) U.S. Cl. ...................................... 360/128
(58) Field of Classification Search ............. 360/294.7, 360/128, 110, 130.3, 294, 290, 240
See application file for complete search history.

(56) References Cited

U.S. PATENT DOCUMENTS

2003/0099054 A1* 5/2003 Kamijima ................... 360/59
2003/0174430 A1* 9/2003 Takahashi et al. ............ 360/75
2005/0046995 A1* 3/2005 Lille ....................... 360/78.04

FOREIGN PATENT DOCUMENTS

JP 05-020635 A 1/1993

* cited by examiner

*Primary Examiner*—Julie Anne Watko
(74) *Attorney, Agent, or Firm*—Antonelli, Terry, Stout and Kraus, LLP.

(57) ABSTRACT

In a slider using thermal expansion type, being adjustable on a flying height thereof, having problems to be solved, i.e., to reduce the electric power consumption, and to lessen the heat load upon a reproducing element thereof, wherein a heating device 4 is located separating from tip portions of the recording and reproducing elements 2 and 3. Also, for deforming only the vicinity of the heating device 4 and the recording and reproducing elements 2 and 3, so as to protrude from, the heating device 4 and the recording and reproducing elements 2 and 3 are surrounded by a resin film 6 of small rigidity, thereby increasing an amount of protrusion of the recording and reproducing elements 2 and 3 per a unit of electric power, but without increasing temperature of the reproducing element 3, with an aim of the structure of cutting off the force from materials of circumferences against the deformation.

14 Claims, 13 Drawing Sheets

MAGNETIC HEAD SLIDER AND MAGNET DISK APPARATUS

BACKGROUND OF THE INVENTION

The present invention relates to a slider, to be applied into a magnetic disk apparatus, and has a function of adjusting a distance between the magnetic disk and a magnetic head thereof.

Conventionally, for example, in Japanese Patent Laying-Open No. Hei 5-20635 (1993) is already known a magnetic head, having a thin-film magnetic head device, in which a lower portion magnetic pole, a thin-film coil being formed insulating through an insulating material layer, an upper magnetic pole, and a protection layer are formed, sequentially, on a substrate. In such the magnetic head, a thin-film resistor is formed within an inside of the layer of insulating material mentioned above, so that a tip portion of the magnetic pole can expand thermally, while conducting electricity therethrough, thereby to project or protrude it from.

Among recording elements to be used for recording, or reproducing elements to be used for reproducing, or recording/reproducing elements, which enables both, i.e., recording and reproducing (hereinafter, they are called by a "recording/reproducing elements", collectively), some of them are weak against heat load thereupon. For example, a reproducing element applying the magneto-resistitve effect (i.e., MR effect) therein, now being mainly used, has a problem that it is weak against the heat load, and it is shortened in the life-time thereof if being exposed for a long time under high temperature condition. If trying to rise up an efficiency of converting electric power into an a mount of deformation at the maximum thereof, in particular, in a heat or thermal actuator relating to such the conventional art mentioned above, it is most suitable that a heating device is located in a very vicinity of the recording/reproducing elements, near to a surface of an air or pneumatic bearing (hereinafter, being called by a "floating or flying surface"). However, if the heating device is located in the vicinity of the recording/reproducing device, there is a possibility that the lifetime of the recording/reproducing element may be shortened due to the heating thereof.

Also, with the heat actuator, a flying height is held after reaching into an equilibrium condition, therefore it is necessary to supply the electric power into the heat or thermal actuator. For this reason, there is a necessity of developing a thermal actuator having a good efficiency of converting the electric power into an amount of deformation, thereby reducing consumption of electric power. In particular, for the magnetic disk to be installed in equipments being portable, there is a strict restriction in the consumption of electric power, therefore it will come up to be a big problem.

BRIEF SUMMARY OF THE INVENTION

An object, according to the present invention, is to make the heat load small, which the thermal actuator gives upon the recording/reproducing device. Further, other object, according to the present invention, is to improve the efficiency of converting the electric power into an amount of deformation in the thermal actuator, thereby reducing the electric power consumption thereof.

For reducing the heat load on the elements relating to the recording and/or reproducing thereof, the heating device (or a heating portion) is so positioned, that an end portion thereof is located at a position being deeper than a side end portion of the floating surface of the recording/reproducing element or at least the reproducing element, viewing them from the floating surface thereof (i.e., the surface opposing to the magnetic disk).

Also, for improving the efficiency of converting electric power into an amount of deformation within the thermal actuator, it is preferable to deform to protrude only a vicinity of the heating device (or the heating portion) and the recording/reproducing element. For this purpose, it is preferable that the recording/reproducing element is enclosed around, by a film(s) or a layer(s) having small rigidity thereof (hereinafter, being called by "a low rigidity film"), thereby cutting off the force from the materials of circumferences against the deformation. As the film(s) or the layer(s) of surrounding the heating device (or the heating portion) and the recording/reproducing element may be provided a film(s) or a layer(s), which is made of a resin, for instance.

Without the low rigidity film(s), since the recording/reproducing element is connected to the slider substrate portion under the condition of being near to be rigid, therefore a large energy is necessary for obtaining protrusion of the recording/reproducing element by a certain amount, while also deforming the substrate portion having large rigidity, so as to protrude it from together therewith. The low rigidity film provided between the recording/reproducing element and the substrate connects between the recording/reproducing element and the substrate, softly. Accordingly, with provision of the low rigidity film, it is possible to reduce the energy necessary for protruding the recording/reproducing element to the substrate side. Enabling of reduction in the energy makes small of an amount of heat generation by the heating device, and thereby lessening the heat load bearing upon the recording/reproducing element.

In the place of provision of the low rigidity film, by bringing a distance between the heating device and the air bearing surface to be equal or greater than 10 μm and equal or less than 50 μm, it is also possible to lessen the heat load, which the thermal actuator gives onto the recording/reproducing element, as well as, to improve the efficiency for converting electric power into an amount of deformation in the thermal actuator.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Figure 1:
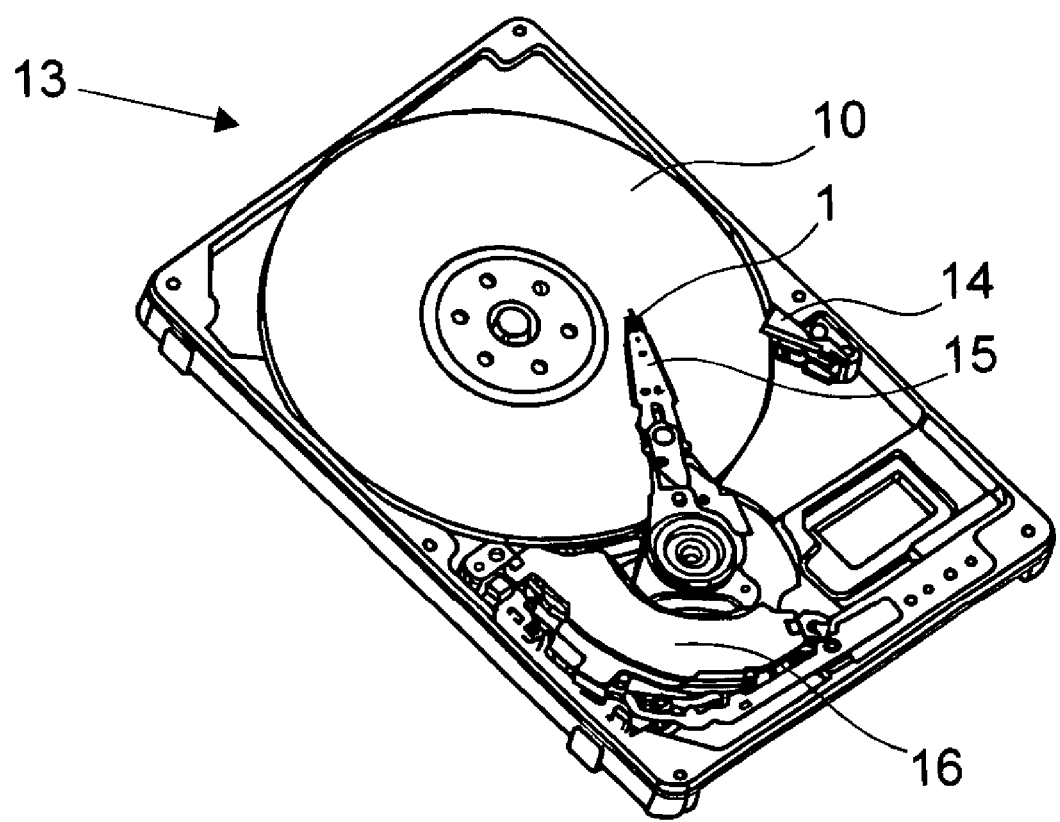
FIG. 1 shows a magnetic disk device installing herein a magnetic head slider, according to the present invention.

Hereinafter, explanation will be given on a magnetic head slider and a magnetic disk using thereof, according to embodiments of the present invention, by referring to the drawings attached therewith.

(Entire Device)

FIG. 1 shows an outline structure of the magnetic disk device, according to one embodiment of the present invention.

The magnetic disk device has a magnetic disk 10, storing magnetic information thereon and being rotated by a spindle motor, and a magnetic head slider (hereinafter, being simply called by a "slider") 1, mounting a recording/reproducing element thereon and being supported and positioned in the radial direction thereof by means of a load beam 15, wherein the slider runs relatively on the magnetic disk 10, thereby reading and/or writing the magnetic information on the magnetic disk. The slider mentioned above can float thereon, due to the wedge film effect of an air as to be an air lubricated bearing, and therefore it never brings about solid contact, on the magnetic disk directly. For achieving high recording density of the magnetic disk device and also large capacity of the disk, accompanying with that, it is effective to shorten a distance between the slider 1 and the magnetic disk 10, i.e., a flying height of the slider, thereby rising up a linear recording density thereof. In recent years, the flying height of the slider is shortened up to around 10 nm or less than that.

The slider 1 is attached onto the load beam 15, being flat spring-like, and it is given with a pushing load onto the magnetic disk surface by means of that load beam, and wherein it conducts a seek operation into the radial direction of the magnetic disk 10, by means of a voice coil motor 16, thereby conducting the recording/reproducing on an entire surface of the magnetic disk. The magnetic head slider 1 refuges or passes by from above the magnetic disk 10 to above a ramp 14, when the device stops or no write command is generated within a certain time period.

However, herein is shown the device comparing a load/unload mechanism therein, but it is also possible to obtain an effect according to the present invention, even in a magnetic disk device of the contact/start/stop method, in which the magnetic head slider 1 waits at a certain specific area on the magnetic disk 10.

(Slider)

Figure 2:
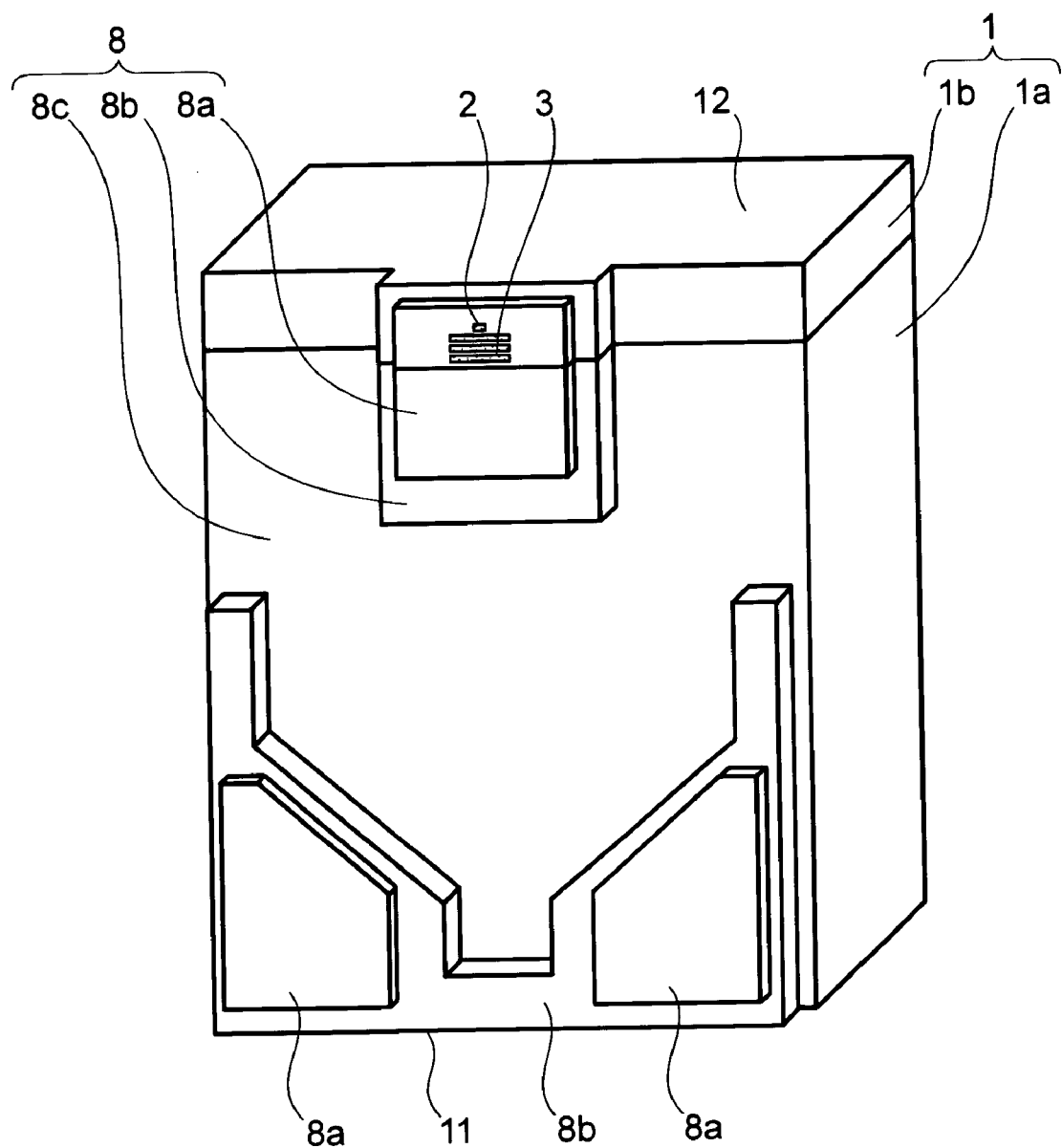
FIG. 2 is a perspective view of the slider, according to one embodiment of the present invention.

FIG. 2 shows only the slider shown in FIG. 1, being enlarged.

The slider 1 is composed of a substrate (a wafer) portion 1a, being made of sintered body of alumina and titan-carbide (hereinafter, being abbreviated by a "altick"), and a thin-film head portion 1b, being formed with a recording element 2 and a reproducing element 3, which are formed through a thin-film processing on the substrate, as well as, wiring patterns formed thereon for those, etc., and being covered with a hard protection film 5 thereon. After laminating the thin-film head portion 1b on the substrate 1a under the condition of the wafer, and then the wafer is cut off into the condition of a bar, thereby being finished smoothly by polishing the cut-off surface thereof. The slider 1 has sizes; for example, a length of 1.25 mm, width of 1.0 mm, and thickness of 0.3 mm, i.e., a shape of about rectangular, and it is constructed with totally six (6) surfaces, i.e., a floating surface 8, an air inflow end surface 11, an air outflow end surface 12, both side surfaces, and a rear side surface. However, if the sizes of the slider are made small much more, but the effect obtained according to the present invention is the same. Upon the floating surface 8 are formed minute steps (i.e., step bearing) through a processing, such as, the ion milling or etching, etc., for example, and it generates air pressure opposing to the disk, but not shown in the figure, thereby achieving a function of the air bearing for supporting the load loading on the rear surface thereof.

On the floating surface 8 are provided such the steps as was mentioned above, thereby they are classified, substantially, into three (3) kinds of parallel surfaces. Thus, they are the following three (3) kinds; a rail surface 8a, being nearest to the disk, a shallow groove surface 8b forming a step bearing surface, being deeper than the rail surface by about 100 nm to 200 nm, and a deep groove surface 8c being deeper than the rail surface by about 1 μm. When airflow generated due to rotation of the disk enters into the rail surface 8a from the shallow groove surface 8b, i.e., being the step bearing, it is suppressed by a tapered flow passage, thereby generating a positive air pressure. On the other hand, when the airflow enters into the deep groove surface 8c from the shallow groove surface 8b, due to the expansion of the flow passage, a negative air pressure is generated. However, FIG. 2 shows only a concept thereof, therefore the relationships of sizes shown therein are not necessarily correct. Thus, in this figure, the height is depicted, emphatically.

The magnetic head slider 1 is designed, so as to float or rise up in a position, such that a flying height at an inflow end 11 of air comes to be larger than that of an outflow end 12 of air. Accordingly, the floating surface comes close to the disk, most, in the vicinity of an end of outflow. In the vicinity of an end of outflow, since the rail surface 8a protrudes from with respect to the shallow surface 8b and the deep surface 8c around, it is said that the rail surface 8a comes close to the disk most, as far as the slider pitch position and the roll position do not exceed a certain limit. The recording element 2 and the reproducing element 3 are formed in a portion belonging to the thin-film head portion 1b on the rail surface 8a. The configuration of the floating surface 8 is designed, so that a distance from the recording element 2 and the reproducing element 3 to the disk can be kept at an appropriate value; such as, about 10 nm, for example, keeping a well-balance between the load suppressing from the load beam and the positive and negative air pressures generated on the floating surface 8.

However, herein the explanation was given only about the slider of two-step bearing floating surfaces, in which the floating surface 8 is formed with three (3) kinds of surfaces 8a, 8b and 8c, substantially being parallel with, but the similar effect can be obtained, with a slider of step bearing floating surfaces, being formed with four (4) kinds of parallel surfaces or more than that.

(Thin-Film Head)

Figure 3:
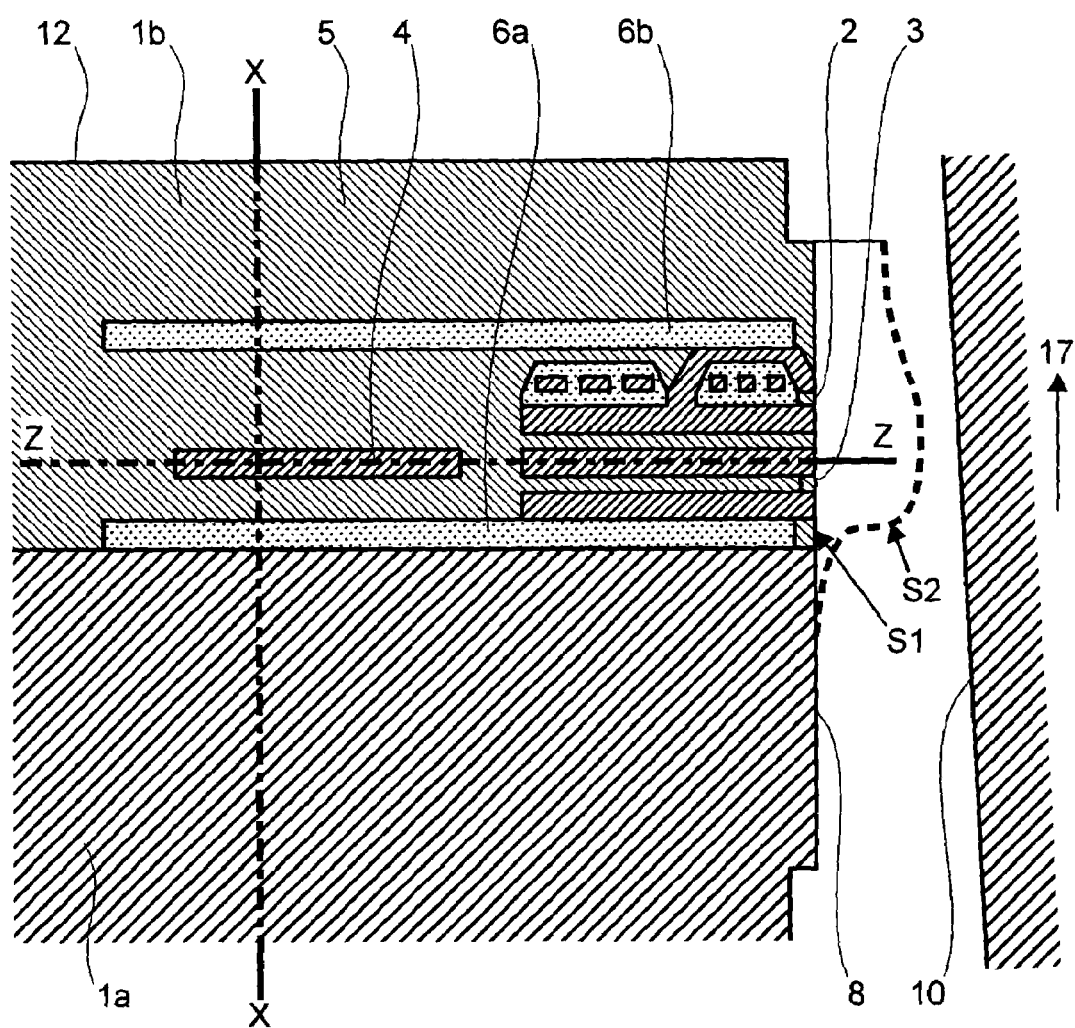
FIG. 3 is an enlarged cross-section view of a central portion of the slider, according to the embodiment of the present invention.

FIG. 3 shows an enlarged cross-section view of the thin-film head portion 1b of the slider shown in FIG. 2, on which the recording and reproducing elements are formed.

The magnetic head for reading and writing magnetic information comprises an inductive recording element 2, for generating magnetic field between magnetic poles due to current flowing through a coil, there by recording the magnetic information, and a magneto-resistive type reproducing element 3, for measuring change of resistance value due to the magnetic field. In more details, on an altick substrate 1a are built up a magneto-resistive element, a magnetic shield, magnetic poles, a write coil, insulating films, and a protection film 5, etc., which are formed with using the thin-film process, such as, plating, spattering, polishing, etc. On the floating surface is formed the step bearing, and on the rail surface, having the highest possibility of being in contact with the disk 10 among the surfaces, a carbon protection film is formed with thickness of several "nm", for protecting it from frictional wear or abrasion even if a short-time and slight contact occurs between the disk, or for preventing the recording element 2 and the reproducing element 3 from corrosion thereof.

(Micro-Heater)

Figure 12:
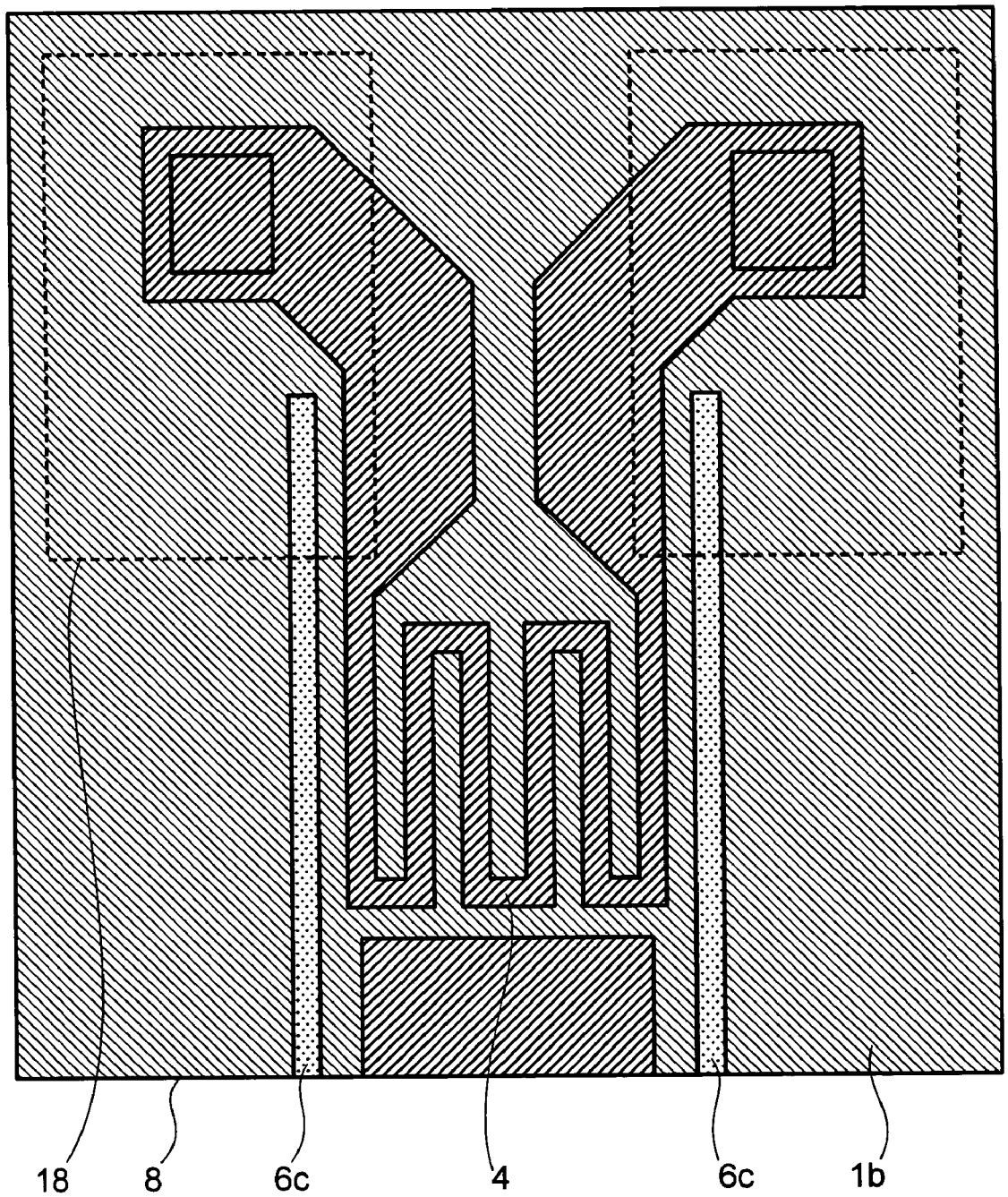
FIG. 12 is a cross-section view taken along Z—Z in FIG. 3.

In the vicinity of the recording/reproducing elements is formed a heating device 4 of resistor element, which is formed with a thin film, with using the thin-film process. In the present embodiment, a thin wire, such as, of permalloy, as a material of the thin-film resistor, for example, being 0.5 mm in thickness and 3 μm in width, is wound around within an area of 60 μm in width, and buried with alumina in gaps therebetween, thereby forming a heat generating body. The resistance value thereof is about 50. The heating device 4 is shown in FIG. 12, which is a view from the outflow end (i.e., the Z—Z cross-section in FIG. 3).

(Optimal Resistance Value)

It is appropriate that the resistance value of the thin-film resistor element building up the heating device 4 is equal to or greater than 20 Ω, and also is equal to or less than 125 Ω. The reasons of this will be shown below. For the purpose of controlling the protrusion due to the thermal expansion, it is necessary to make control on an amount of heat generation, and in particular, when obtaining a certain amount of heat generation, the current must be small while the voltage high, if the resistance value is large. Since the voltage is 2.5 V at the maximum, which can be supplied to each head on the existing magnetic disk at present, therefore it is necessary to make the resistance value being equal or less than 125 Ω, if obtaining the heat generation of 0.05 W at the maximum. Also, in case of obtaining a certain amount of heat generation, the current must be large while the voltage low if the resistance value is small. Since the current is 0.05 A at the maximum, which can be supplied to each head on the existing magnetic disk at present, therefore it is necessary to make the resistance value being equal or greater than 20 Ω, if obtaining the heat generation of 0.05 W at the maximum. The reason of the heat generation of 0.05 W at the maximum will be mentioned later.

(Effect of Resin Film)

Figure 4:
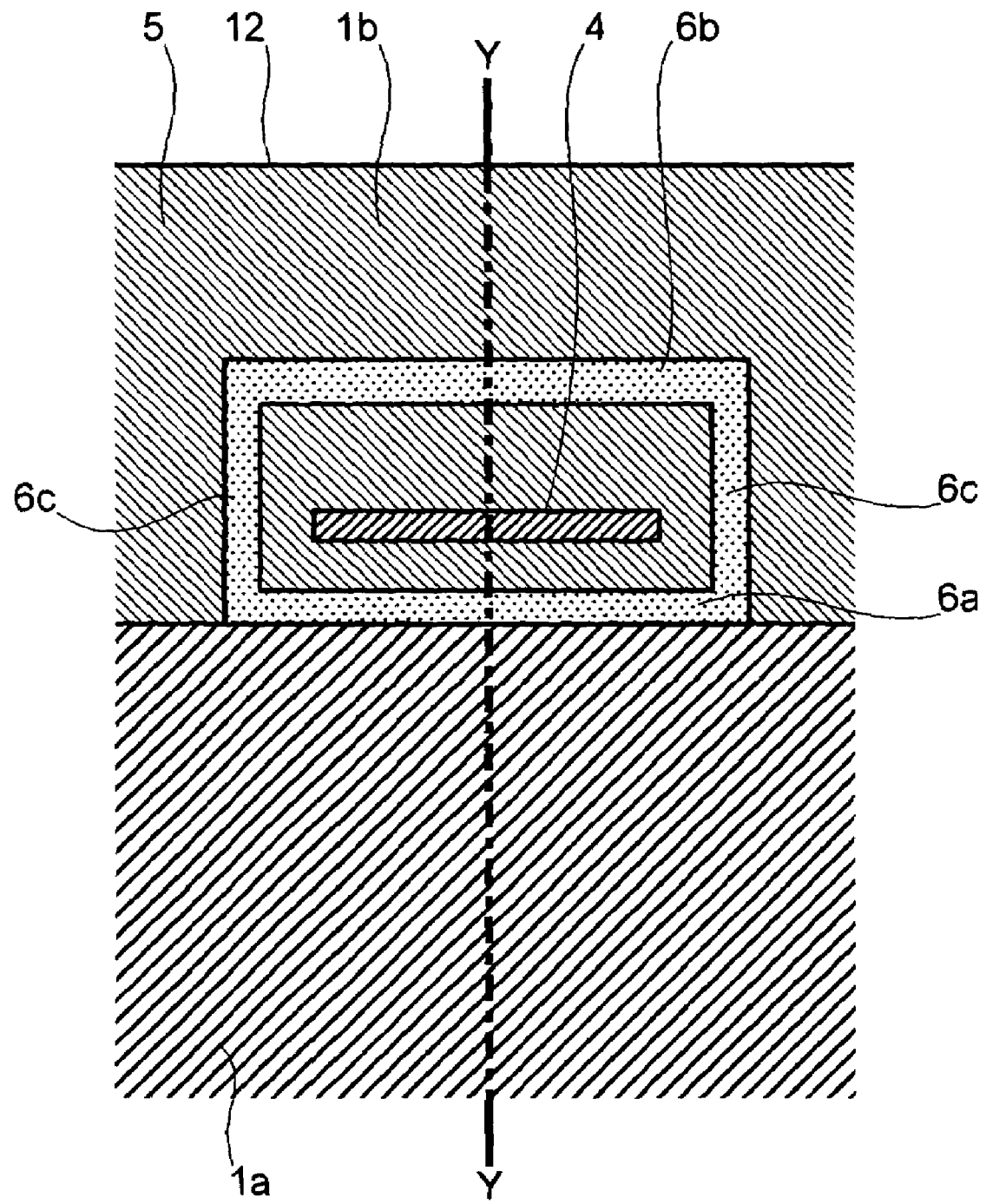
FIG. 4 is a cross-section view taken along X—X in FIG. 3.

FIG. 4 shows the X—X cross-section in FIG. 3.

The feature of the present embodiment, comparing to the conventional art, lies in existences of a lower portion resin film 6a, an upper portion resin film 6b, and a side portion resin film 6c. Thus, the hading device 4 is completely enclosed by the resin films, in every direction (but, except for the direction of floating or flying). Also, the recording element 2 and the reproducing element 3 are almost enclosed by the resin films in every direction (except for the direction of floating or flying), but except for the portions near to the floating surface 8. When the heating body conducts electricity therethrough, the resin film insulates the heat, thereby enabling to worm up a portion to be expanded, concentrically, and also since the resin absorbs the deformation, therefore it does not transmit the deformation to the circumference thereof due to the softness thereof, thereby enhancing the protrusion of the element portion. In other word, only the portion where the deformation should be taken, i.e., only the vicinity of the heating device 4 and the recording/reproducing elements can be deformed to protrude, therefore it is a mechanism of cutting off the force of the materials of the circumferences resisting against the deformation, by surrounding or enclosing the heating device and the recording/reproducing elements with the resin films of small rigidity or stiffness. The configuration S2 thereof, when it protrudes from, is shown by a broken line in FIG. 3. On the other hand, in a case where no resin film is provided, the recording/reproducing elements 2 and 3 are connected with the slider substrate portion 1a under the condition of near to be rigid, therefore for the purpose of protruding the recording/reproducing elements 2 and 3 by a certain amount therefrom, a large energy is needed, so that they are deformed together with the substrate portion 1a having a large rigidity thereof.

Also, the resin film achieves the function of not restricting the deformation in the longitudinal direction (i.e., a direction from the inflow to the outflow, or the reversed) and the width direction (i.e., a direction being orthogonal to the longitudinal direction) of the slider, however since any portion is not shielded by the resin film in the direction of thickness of the slider, i.e., the direction of float, therefore the thermal expansion of the surrounding materials of the heating device can transmit to the position of the recording/reproducing elements 2 and 3, even if the position of the heating device 4 is separated from the recording/reproducing elements 2 and 3, to a certain degree in the direction of floating. Accordingly, it is possible to separate the position of the heating device 4 from the recording/reproducing elements 2 and 3, thereby bringing the heat load bearing upon the recording/reproducing elements 2 and 3 to be small.

Further, FIG. 3 is a conceptual view, and therefore the relationship in sizes shown therein is not necessarily correct. Thus, although inherently an amount of the protrusion is of a nanometer order, the configuration S2 of the protrusion is depicted herein, emphatically.

The resin film according to the present invention, in particular, the resin film 6a disposed between the recording/reproducing elements 2 and 3 and the heating device 4 and the substrate 1a achieves the function of connecting between the recording/reproducing elements 2 and 3 and the substrate 1a flexibly, so that the energy, being necessary for protruding the recording/reproducing elements therefrom by a certain amount, comes to be small. For this reason, an amount of heat generation by the heating device can be made small, thereby enabling to lessen the heat load bearing upon the reproducing element. Also the resin films 6b and 6c other than 6a achieve an effect of enhancing the protrusion of element portions, however a certain effect can be obtained, according to the present invention, even if only the resin film 6a is provided, but omitting either 6b or 6c or the both. Accordingly, for obtaining the effect according to the present invention, it can be said that, the lower portion resin film 6a is necessary to be provided, at least, and more preferably, the upper portion resin film 6b and the side portion resin film 6c.

Though the lower portion resin film 6a is in contact with the slider substrate portion 1a, directly, in FIGS. 3 and 4, however it is also possible to provide an alumina layer between the lower portion resin film 6a and the slider substrate portion 1a.

(Resin should not be Exposed on Floating Surface)

The reason of leaving the alumina protection film 5 as it is, but without surrounding the portions near to the floating surface 8 by such the resin films, lies in that; thus, it is also preferable to use the alumina, being as superior as carbon (i.e., diamond-like carbon) in the properties against friction and/or abrasion, as a base material under the carbon protection layer, since there is a possibility that the floating surface contacts with the disk, however it is not preferable to use such the resin on the floating surface, being inferior in the hardness thereof.

(Data of Protrusion Amount)

Figure 5:
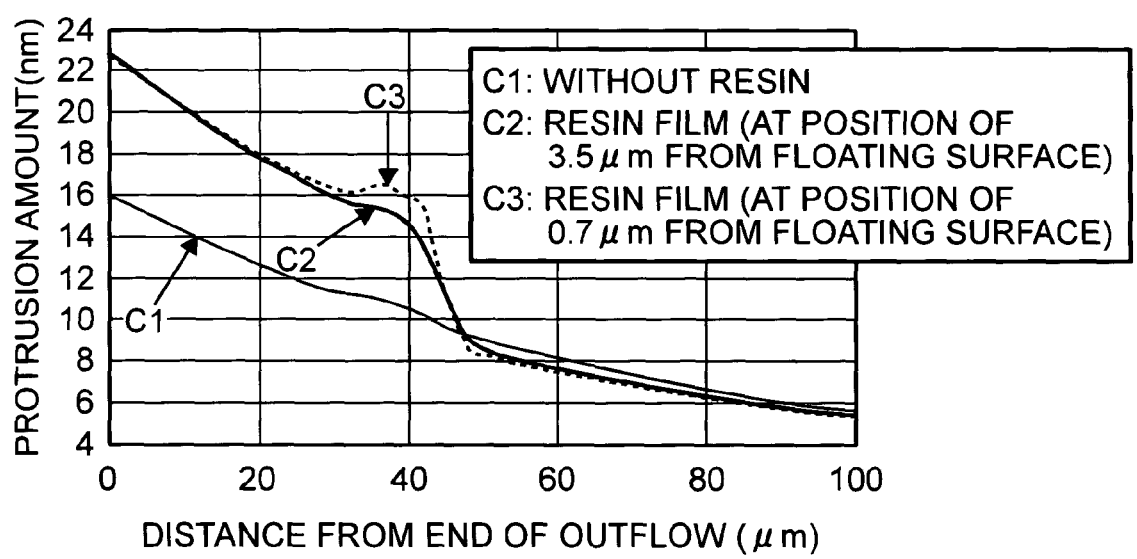
FIG. 5 is a view for showing a simulation result of deformation upon a floating surface.

FIG. 5 shows a result of simulation on the deformation. The horizontal axis indicates a distance from the outflow end surface 12 (at the position in the longitudinal direction) while the vertical axis a protrusion amount on the floating surface, and a curve C1 shows the configuration deformed without the resin films 6a, 6b and 6c, while C2 and C3 the configurations deformed with the resin films 6a, 6b and 6c, respectively. On the curves C2 and C3, the distances from the floating surface 8 to the resin films 6a, 6b and 6c differs from. Thus, it is determined to be 3.5 µm on the curve C2, and 0.7 µm on the curve C3, respectively. It is also determined that an amount of heat generation by the heat generating device be 0.05 W, the thickness of resin film 6a be 5 µm, the thickness of resin film 6b be 1.2 µm, and the thickness of resin film 6c be 5 µm. Regarding the width direction, values on the cross-section at a center of the slider are plotted. The position where the reproducing element 2 lies is that separated from the outflow end at the distance 40 µm.

The curve C2 where the resin film lies thereon increases from about 11 nm up to about 15 nm, i.e., 1.4 times higher, comparing to the curve C1 when no such the resin film lies thereon, in the amount of deformation in the reproducing element (at 40 µm from the outflow end). Further, on the curve C3 where the distance is shortened from the floating surface to the resin film, the deforming amount at the position of the reproducing element reaches to about 16 nm. In this manner, the effect can be ascertained that the protrusion at element portions can be increased due to the resin films.

(Change in Flying Height)

Further, through a thin-film gas lubrication simulation, studies are made on an influence given by the existences of the resin films 6a, 6b and 6c, upon changes of an amount on floating before and after heating at the position of the reproducing element. Though an amount of change on floating is 2.4 nm before and after heating of 0.05 W to the heating device 4, when no resin film lies, however it rises up to 5.0 nm when the resin film lies. The cause of increase in the amount of change on floating, being two (2) times large or more than that due to the existences of the resin films, can be considered as below. Thus, since the protruding configuration is smooth when no resin film lies, air pressure newly produced by the protrusion is large, thereby changing the posture angle (or a pitch angle) of the slider, therefore all of an amount of protrusion cannot be converted into the change of an amount of floating. In the case where the resin film lies, since the protruding configuration is steep, then the air pressure newly produced by the protrusion is small, thereby hardly changing the posture angel of the entire of slider, therefore almost of an amount of protrusion can be converted into the change of an amount of floating. As a result of the above, with the structure according to the present invention, the change of an amount of floating can be increased or enhanced two (2) times large, under the condition of the same amount of heat generation, or in other words, electric power consumption can be reduced down to a half (½) of the necessary for obtaining a height of change on flying desired.

(Reason of Necessity of Heat Generation of 0.05 W)

The purpose of provision of the heating device is to make an adjustment on spacing between the recording/reproducing elements and the magnetic disk, by means of the deformation due to thermal expansion, thereby neglecting the margin for the height of flying mentioned above. In recent years, it is enough for an amount of change on the flying height to be 5 nm at the maximum, since the margin of the flying height is designed to be about 5 nm. In accordance with the simulation result mentioned above, in order to bring about the change on flying of 5 nm, it is enough for the thin-film resistor to generate only the heat of 0.05 W at the maximum.

(Regarding Rise-Up of MR Temperature)

Rise-up of temperature is about 5.5° C., at the position of the reproducing element 3, when the heating device 4 generates the heat of 0.05 W. The reproducing element, applying the magneto-resistive effect (i.e., the MR effect) therein, is weak against the heat load thereupon, and therefore it has a feature that the lifetime is shortened if being exposed under high temperature for a long time. However, if the rise-up of temperature is only about 5° C., it can be used without such the problems. If not introducing the resin film 6a, etc., there are remaining only the ways; such as, of obtaining the amount of change on flying desired while neglecting the large consumption of electric power, or obtaining the amount of change on flying desired while neglecting the deterioration on the lifetime of the reproducing element. According to the present invention, it is possible to enhance or increase the height of change on flying, while satisfying requirements of the consumption of electric power and reliability.

(Other Embodiment: Provision of Expander)

Figure 6:
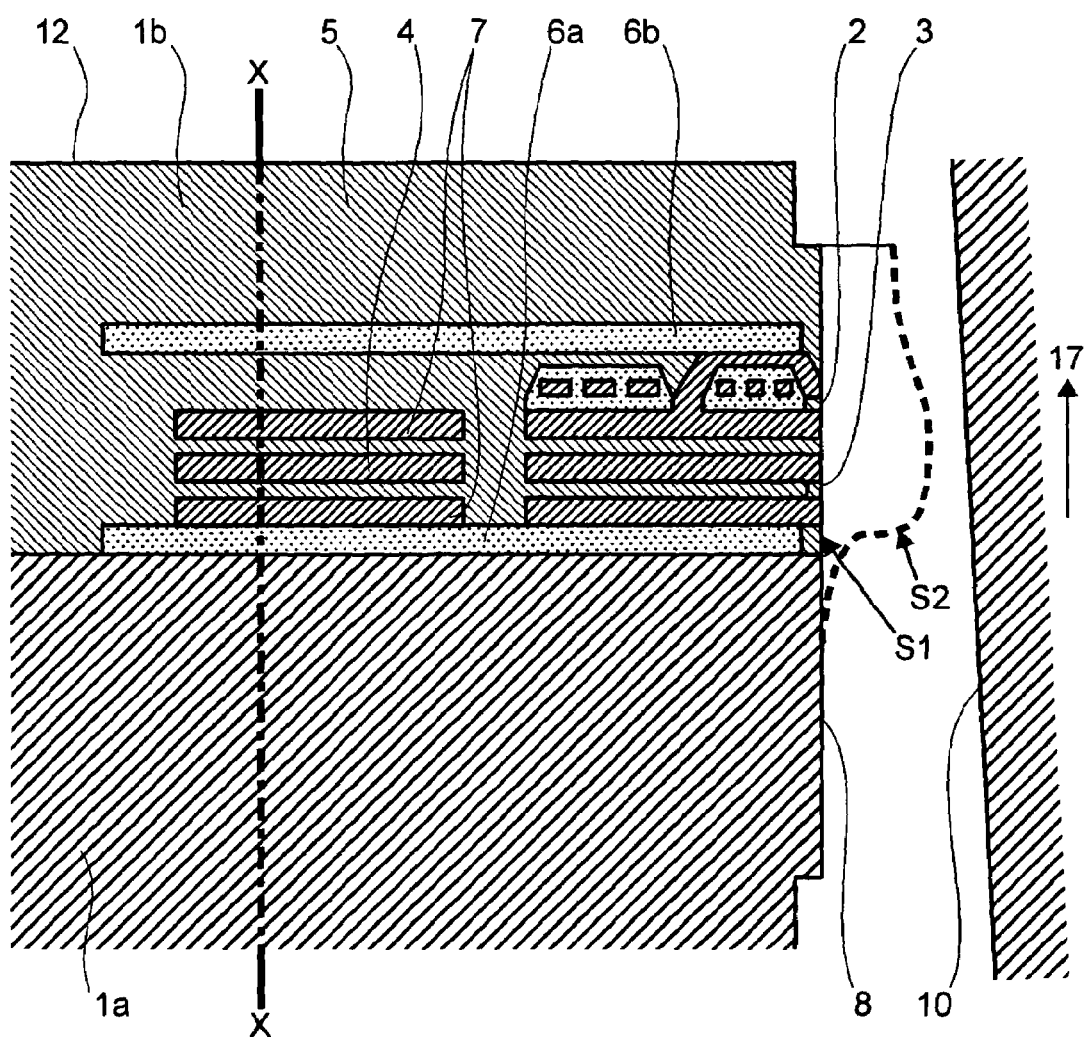
FIG. 6 is an enlarged cross-section view of a central portion of the slider, according to other embodiment of the present invention.

FIG. 6 shows an embodiment of other structure, according to the present invention, wherein an expander 7 is provided in a vicinity of the heating device 4, for the purpose of thermally expanding thereof. Since the temperature rises up at the most in the vicinity of the heating device 4, it is possible to convert the heat generation into the deformation effectively, by using a metal thin-film having a coefficient of linear expansion being higher than that of the alumina protection film 5.

(Other Embodiment: Unification with Insulating Film Around Coil)

Figure 7:
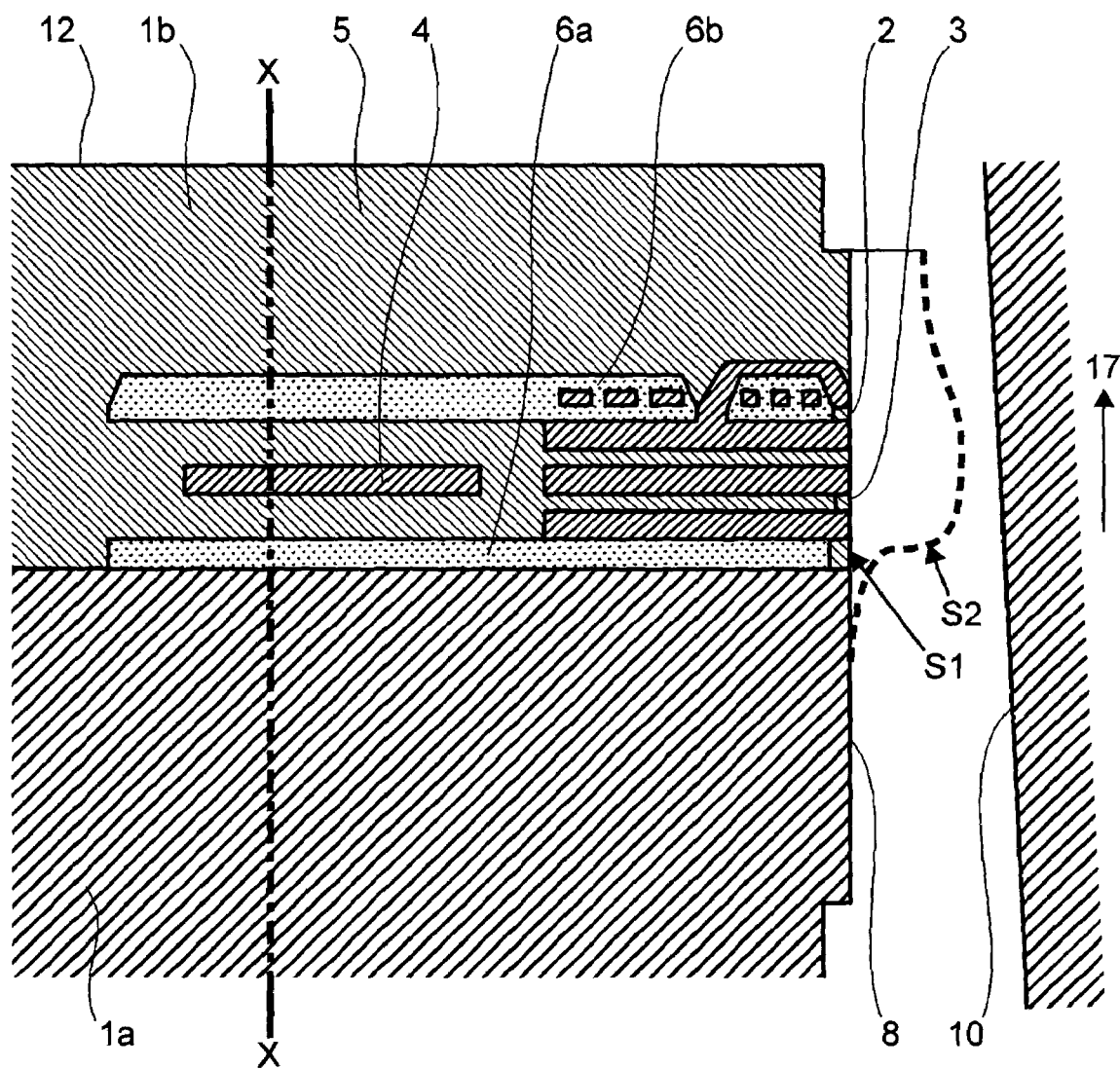
FIG. 7 is also an enlarged cross-section view of a central portion of the slider, according to other embodiment of the present invention.

FIG. 7 shows an embodiment of other structure, according to the present invention, wherein the upper resin film 6b is unified with the insulating film around the coil in one body. According to the structure of the present embodiment, it is possible to obtain the effect same to that of the first embodiment.

(Other embodiment: Heater on Base Alumina Film)

Figure 11:
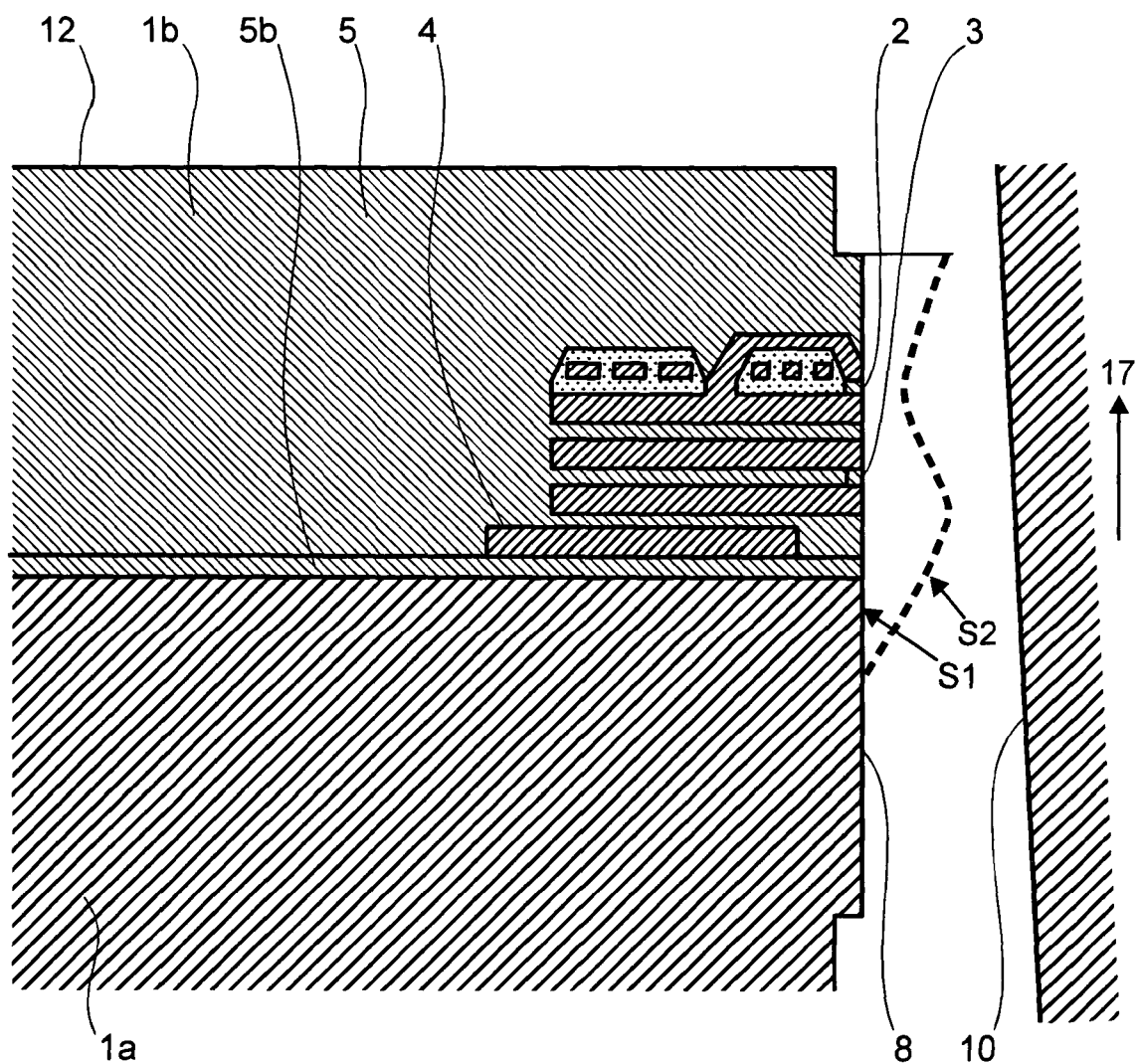
FIG. 11 is an enlarged cross-section view of the central portion of the slider, according to other embodiment of the present invention.

FIG. 11 shows the structure for achieving reduction of electric power consumption while preventing the protrusion from deterioration due to rise-up of circumferential temperature, comparing to the conventional head. The heating device 4, made from the thin-film resistor shown in the first embodiment, is formed on a base alumina film 5b, which is formed on the substrate 1a first, and then an insulating layer is formed thereon. Next, a lower portion shield of the reproducing element 3 is formed. The structure of the present embodiment is suitable for the magnetic disk device, in particular, for use in a portable computer having a strict condition of the circumferential temperature thereof.

It is appropriate to determine the distance from the floating surface 8 up to the heating device 4, to be equal to or greater than 10 μm and equal to or less than 50 μm. The reasons of this will be described below. First of all, if the distance from the floating surface 8 to the heating device 4 is less than 10 μm, the temperature at the reproducing element 3 comes up to be equal or greater than 10° C. when the heating elements generates heat of 0.05 W, and therefore it is impossible to neglect ill influences given on the lifetime of the reproducing element. Second, if the distance from the floating surface 8 to the heating device 4 exceeds 50 μm, an electric power consumption, being equal or greater than 0.05 W, is necessary for obtaining the height of change on flying of 5 nm at the position of the reproducing element, and it cannot be neglected in the magnetic disk device, in particular, for use in the portable equipments. Accordingly, it is preferable to determine that distance to be equal or greater than 10 μm and equal or less than 50 μm.

Or, in other words, it can be said that the size mentioned above is determined to be equal or greater than 60 times large, and equal or less than 300 times large, comparing to the size of the magneto-resistive element.

Further, though explaining that the heating device 4 is positioned on the base alumina film 5*b*, in a direction of the layer thereof, for the reason of easy machining thereof, however the same effect can be obtained also if it is positioned on a layer other than that, for example, between the upper portion shield and the lower portion magnetic pole.

(Heater Element & the Depth of Shield)

Figure 13:
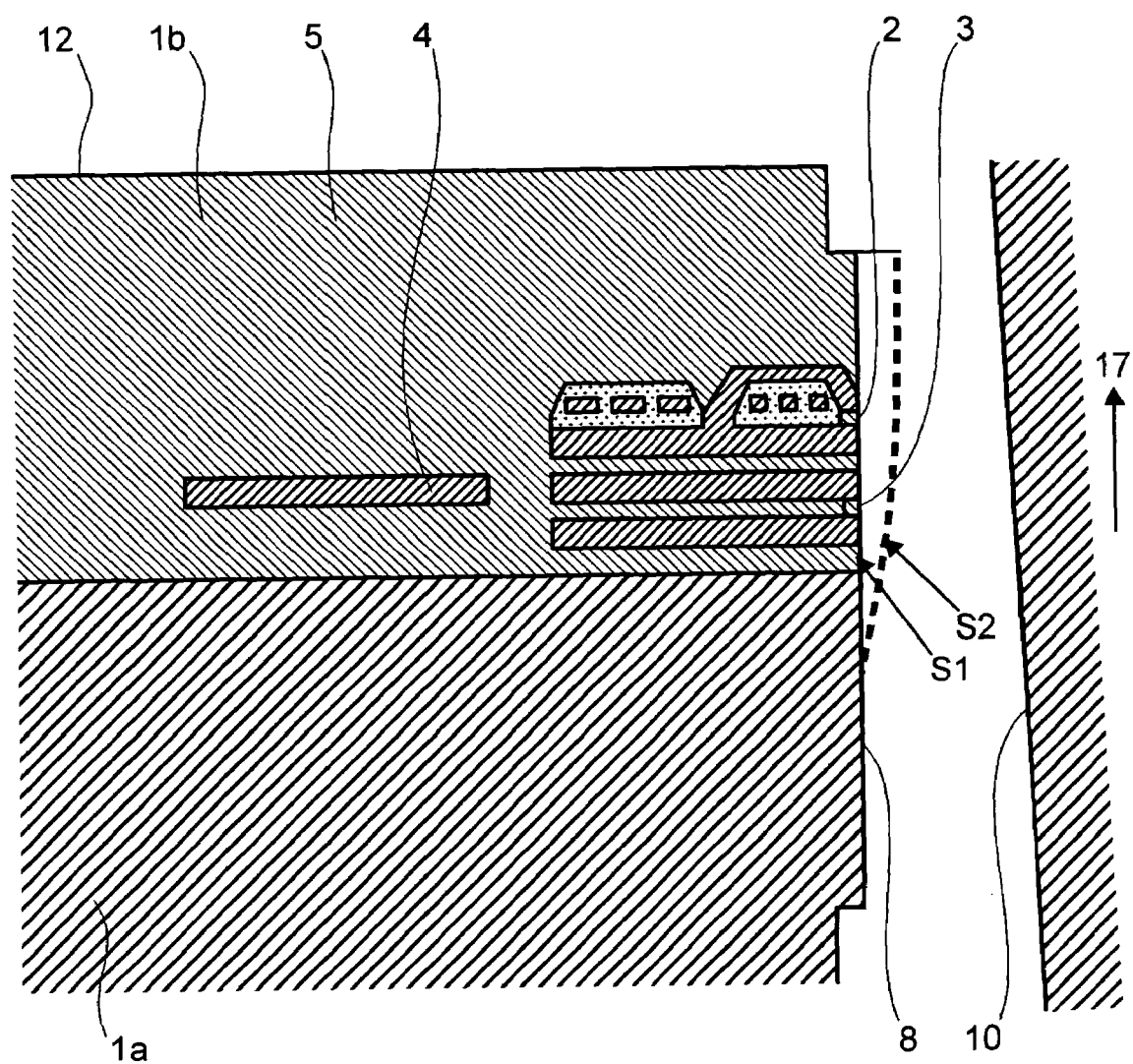
FIG. 13 is an enlarged cross-section view of the central portion of the slider, according to other embodiment of the present invention.

FIG. 13 shows the structure of slider, in particular, in case of designing for accomplishing more important purposes; thus, for preventing the life-time of the reproducing element and the protrusion from deterioration due to rise-up of the circumferential temperature, comparing to the conventional head, but not aiming reduction of the consumption of electric power as a main purpose thereof. The heating device 4 is positioned deeper than the reproducing element 3, viewing it from the floating surface 8, thereby enabling to make the heat load small upon the reproducing element. For the magnetic disk, being strict in condition of the circumferential temperature and requiring a long life-time thereof, the structure of the present embodiment is suitable. Further, in the figure, though the heating device 4 is formed on the same layer of the upper portion shield, but the same effect can be obtained if it is formed on a layer other than that.

(Adjusting Method of Flying Height)

Next, explanation will be given on an actual adjusting method for a height of flying, according to an embodiment of the present invention.

Processing for adjusting the flying height can be classified into three (3) stages, i.e., when designing, when testing before shipping, and when being used, roughly. When designing, it is so designed, that only the slider at a low limit of dispersion or variability contacts on the disk, when operating under the maximum circumferential temperature to be expected, under the lowest atmospheric pressure to be expected, and under continuous writing condition. Thus, it is same to the designing of the conventional slider, accompanying no adjustment on the flying height. The designing condition differs from, depending upon the equipments or apparatus, in which the magnetic disk device is used; for example, for the magnetic disk device for use in the portable equipments, wherein the circumferential temperature changes high and low, therefore being very hard in the difference thereof, and for the magnetic disk device for use in a server, wherein the thermal protrusion occurs hard, due to heat generation of the magnetic pole when operating under the continuous writing, thereby lowering the flying height, etc.

Figure 8:
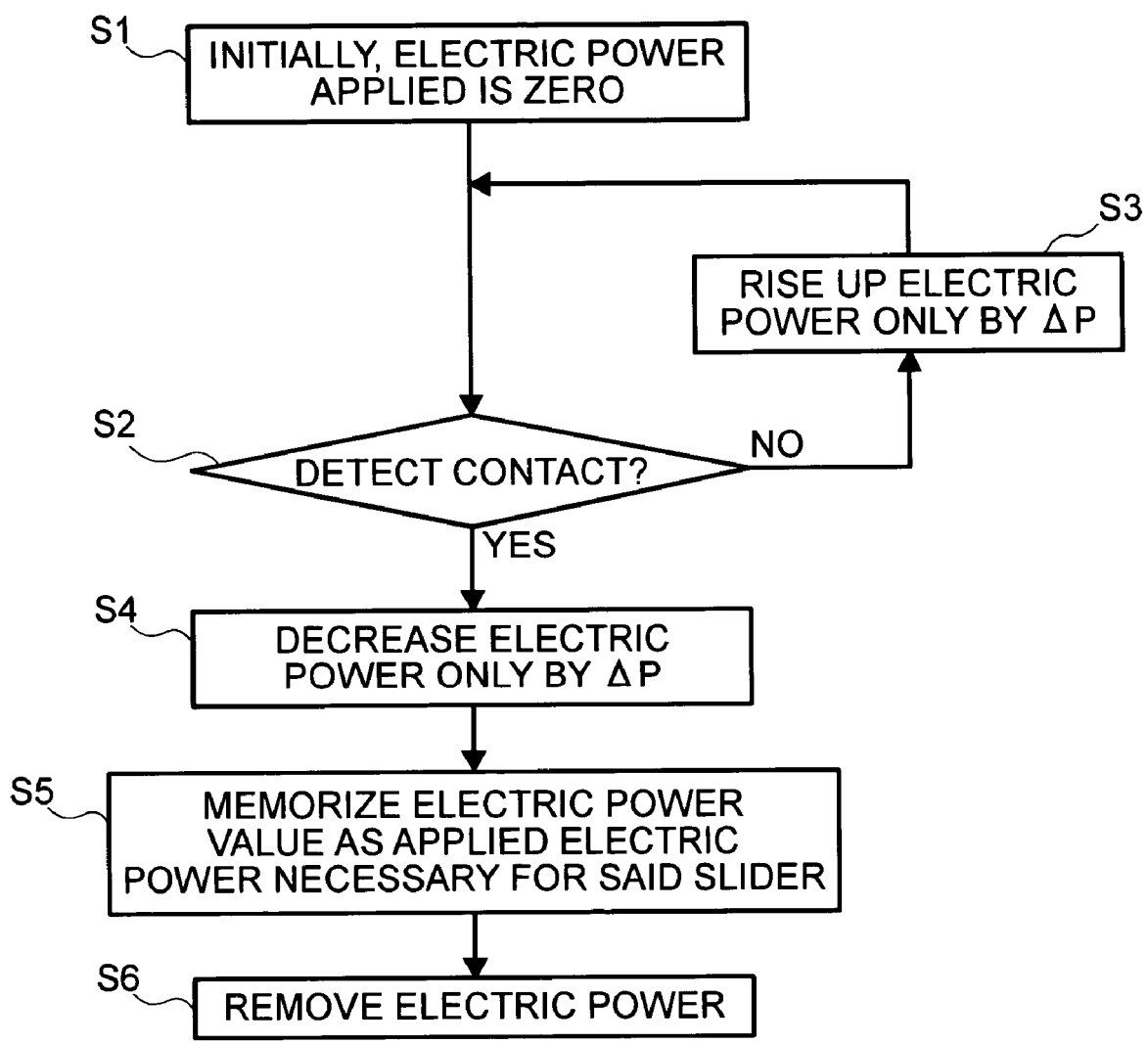
FIG. 8 is a flowchart for showing a method of detecting a flying height.

When testing before the shipping, the test is made on the flying height on each of the sliders, and is memorized in a memory. A testing method of the flying height will be shown, in more details thereof, by referring to FIG. 8. Since an adjustment height on flying is proportional to an electric power supplied thereto, therefore the electric power to be applied is turned into zero (0) condition, and thereafter the applied electric power is increased, gradually. Thus, it is a method of calculating out the flying height of said the slider, when detecting the contact between the slider and the disk, from the electric power supplied at that time and a proportional coefficient between the adjustment height of flying and the electric power supplied. A method for detecting the contact between the slider and the disk will be mentioned later. Further, if memorizing therein, not only the respective dispersion on the flying height of the slider, but also a difference between an inner and an outer peripheries thereof, it is possible to increase the accuracy, further, in the adjustment on flying height.

When being used, basically, an electric power is supplied to an active head when receiving a read/write command from a client side, such as, a computer, etc., for example, depending upon the flying height of the said slider. No electric power is supplied to the head operating under an idle condition. An amount of electric power to be supplied to the active head is reduced with using the proportional coefficient between the adjustment height of flying and the supplied electric power, when operating under the continuous writing condition, and also when operating under the high circumference temperature, but it is increased when operating a low circumference temperature.

(Basic Adjusting Algorithm being Simplest)

Figure 9:
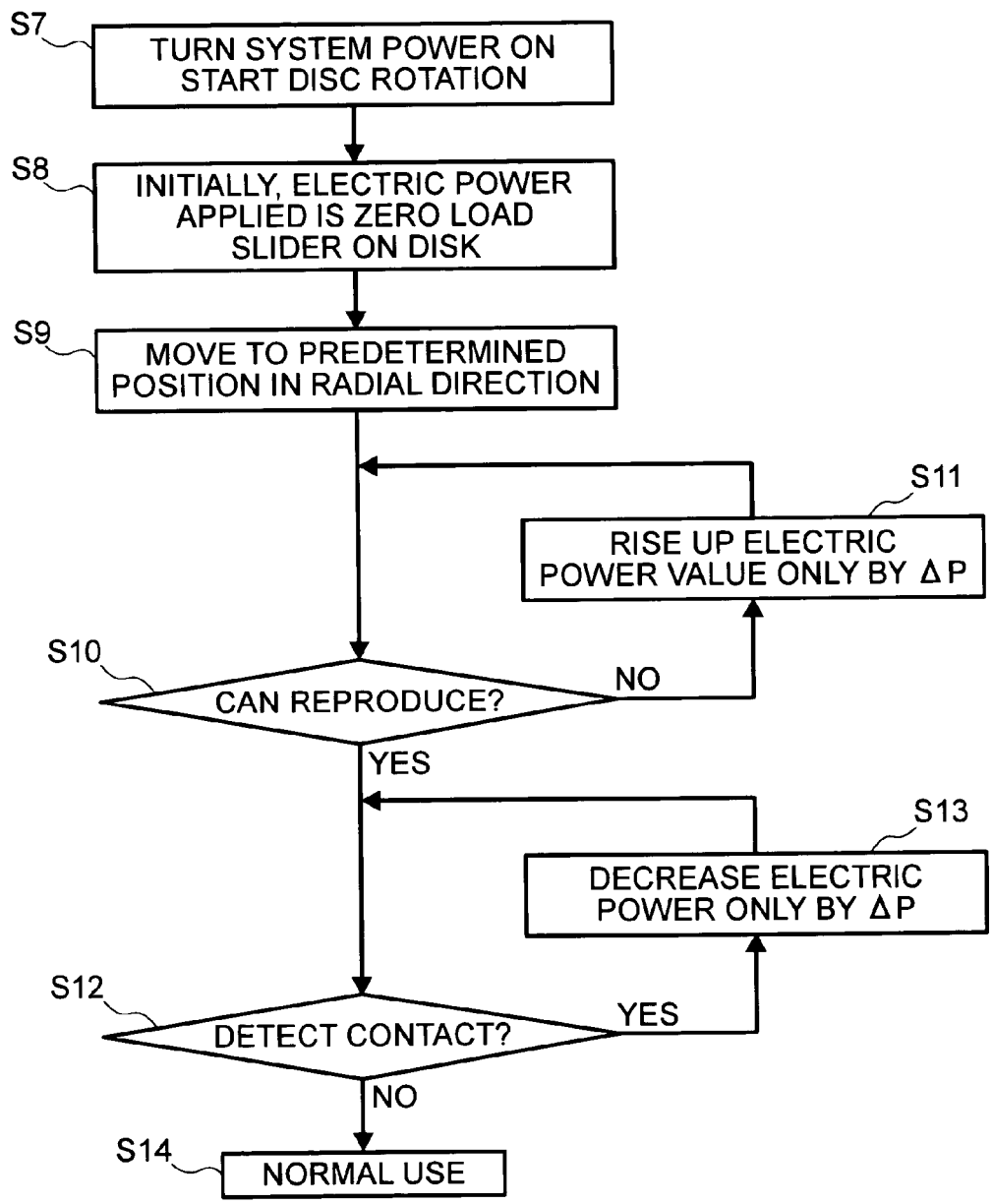
FIG. 9 is a flowchart for showing a method of adjusting the flying height.

The most basic control algorithm is shown in FIG. 9.

Although there is other method of providing sensors separately, for measuring atmospheric pressure and/or temperature, however since no problem occurs if the following two (2) conditions are satisfied; thus, the contact (i.e., coming close too much) will not occur, and error (i.e., far too much) will not occur in reproducing the magnetic information, under the condition where all the influences of atmospheric pressure, temperature, difference of an individual, etc., are included, therefore the simplest control method is to conduct a feedback control of adjusting an input electric power to the heating device only when the contact and/or the reproducing error occur while monitoring them. However, for protecting the element from being injured by a shock due to loading, it is also effective to bring the flying height to be high, but without conducing electricity through the heating device when loading the slider on the disk, in particular, when initiating the device. A method for detecting the contact will be mentioned later.

However, with a method for compensating a fluctuation of the flying height caused by the atmospheric pressure difference, and a fluctuation of the flying height due to the difference of an individual head, it may be enough to apply it only when the device is initiated, as shown in figure, however with the fluctuation of the flying height caused due to the temperature difference, it is necessary to monitor the contact and the reproducing error, at every predetermined time period, or always when it is used. Accordingly, in a case of the magnetic disk device to be used in the equipments, in which the change in the temperature difference is large when being used, it is effective to compensate the change of the flying height, at every predetermined time period, or always when it is used.

Information of circumferential temperature can be obtained from a temperature sensor attached with the device, and if so, it is possible to achieve an adjustment on the flying height with much higher accuracy.

(Method for Detecting Contact)

As a method for detecting the contact, there are (1) a method of using an acoustic emission (AE) sensor, (2) a method of monitoring thermal asperity, as being noises appearing on the reproducing signal due to contacting heat generation, (3) a method of monitoring an off-track signal (i.e., a position error signal), which is generated when off-track occurs due to microscopic rotation of the slider around a pivot through the contact friction force, etc.

On the other hand, with reproducing error of magnetic information, it is enough to monitor a so-called bit error rate. Though being difficult to monitor the recording error, differing from the reproducing error, however since it is common that the flying height is lower than that when reproducing, because of expansion of the element portion due to heat generation of the coil of the recording element when recording, therefore a possibility is also low that the recording error occurs if under the condition where the reproducing error will not occur.

Also, as another method relating to the adjustment on the flying height, there is one of monitoring a distance between the reproducing element and a medium at the position, with using amplitude of the reproducing signal, and it can be also applied.

(System Configuration)

Figure 10:
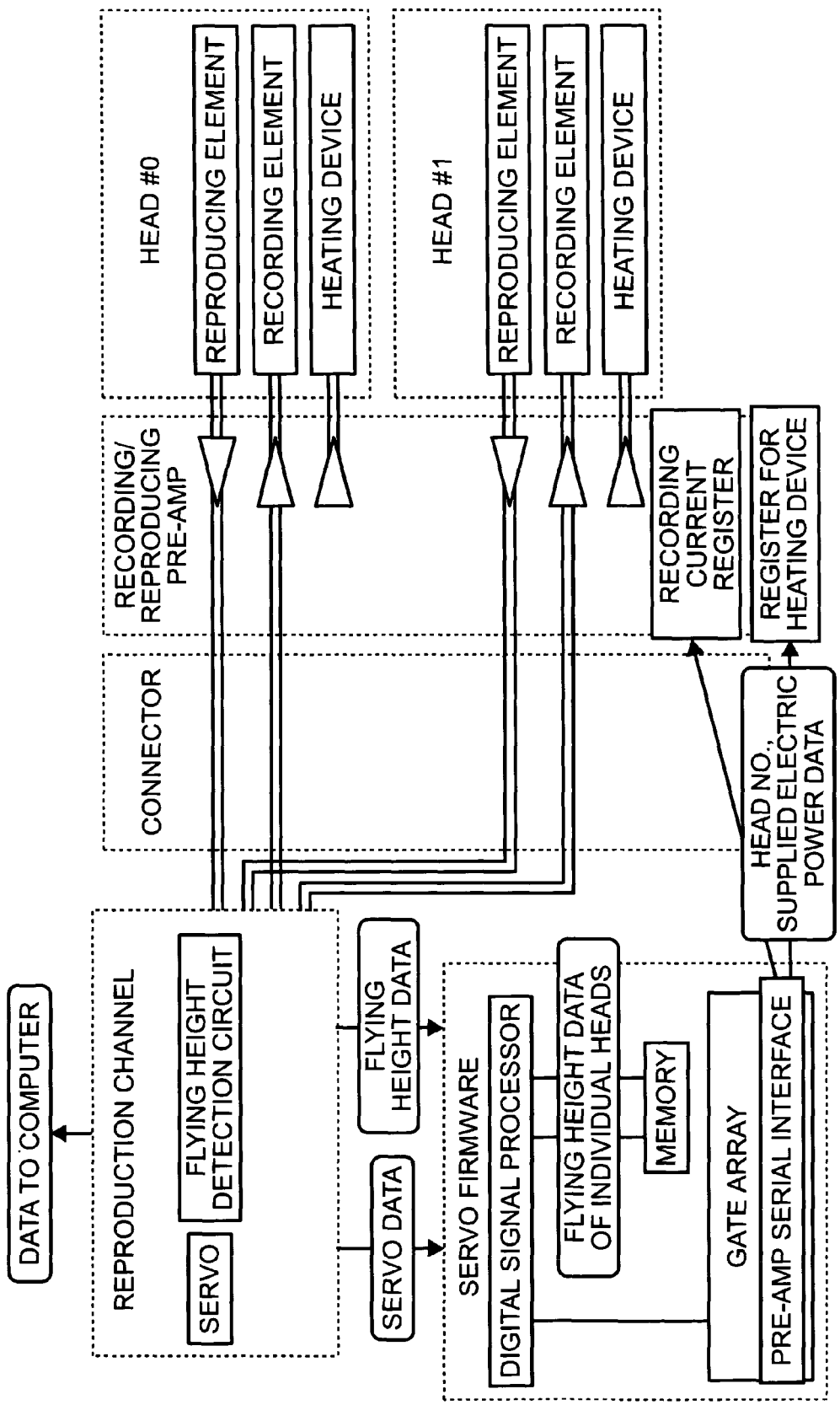
FIG. 10 is the system configuration of the magnetic disk device according to the present invention.

FIG. 10 shows the system configuration of the magnetic disk device equipped with the adjusting function of the flying height, according to the present invention.

(Order of Terminals and Wiring)

It is preferable that the terminals for use of the heating device are provided at both ends of the slider, due to the reasons, which will be mentioned below. The wirings on both sides of the slider come to a center of a suspension, when they are wound around, coming out from terminals, six (6) terminals in total, for use of the heating device and the recording/reproducing elements, being bonded on wiring pads on a suspension gimbals, passing through above two (2) pieces of arms of the gimbals while being divided into three (3) pieces by each, joining together again into six (6), and reaching to a base portion of the suspension, as a result thereof. The distance between the wires must be made small or narrow if trying to wire six (6) pieces thereof at the position where only four (4) pieces are wired at the present, however there is caused a possibility of generating noises to each other if recording current and reproducing current flow are neighboring with each other. If allowing direct current for use in the heating device to flow through two (2) wires at the center thereof, separating the two (2) wires for recording current and the two (2) wires for reproducing current, it is possible to reduce the possibility of generating the noises.

As was fully explained in the above, according to the present invention, since the heating device (or the heat generating portion) is positioned, so that the end portion thereof lies on a side deeper than the side end portion of the floating surface of the recording/reproducing elements, viewing from the side of floating surface (i.e., the surface opposing to the magnetic disk), therefore it is possible to reduce the heat load given on the reproducing element. Also, with the structure of enclosing around the heating device (or the heat generating portion) and the recording/reproducing elements by a film(s) or a layer(s), being small in the rigidity thereof, thereby cutting off the forces from the materials on circumference against the deformation, it is possible to increase an amount of protrusion of the recording/reproducing elements per a unit of electric power, but without increasing temperature of the reproducing element. With this, it is possible to bring the consumption of electric power necessary to be small, without giving ill influences upon the lifetime of the reproducing element. As a result thereof, by adjusting the flying height for each the individual head, or depending upon environment of use thereof, it is possible to abolish the margin of flying height, and it shortens the flying height of the recording/reproducing elements while preventing the slider and the disk from contacting on each other, thereby contributing to increase of recording density on the magnetic disk surface, and further to a large capacity and small sizing of the device.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A magnetic head slider, comprising:
   a recording element for recording information on a magnetic disk;
   a reproducing element for reproducing information from the magnetic disk;
   a slider for mounting thereon said recording element and said reproducing element, disposed opposing the magnetic disk; and
   a heat generating portion provided on said slider, for thermally expanding a vicinity of at least said reproducing element,
   wherein said heat generating portion and said reproducing element are disposed so that an end portion of said slider on a surface side opposing to the magnetic disk, in said heat generating portion, is located deeper than an end portion of said slider on a surface side opposing to the magnetic disk, in said reproducing element, and
   wherein said recording element and said reproducing element are formed through laminating thin-films on a substrate, being disposed so that said heat generating portion is located on said substrate side with respect to said recording element and said reproducing element, in a normal direction of the substrate, i.e., in a direction of laminating the thin-films, and having a metal film(s) on one side or on both sides of said heat generating portion relating to said thin-film laminating direction, to be thermally expanded by means of said heat generating portion.

2. A magnetic head slider, as described in the claim 1, wherein said recording element and said reproducing element are constructed to be a single element.

3. A magnetic head slider, as described in the claim 1, wherein said recording element and said reproducing element are formed through laminating thin-films on a substrate, being disposed so that said heat generating portion locates on said substrate side with respect to said recording element and said reproducing element, in a normal direction of the substrate, i.e., in a direction of laminating the thin-films, and being provided with a layer made of a resin material between said heat generating portion and said substrate relating to said thin-film laminating direction.

4. A magnetic head slider, as described in the claim 1, wherein a distance between said heat generating portion and the surface of said slider opposing to the magnetic disk is equal to or greater than 10 μm and is equal to or less than 50 μm.

5. A magnetic head slider, as described in the claim 1, wherein said reproducing element is one, using a magneto-resistitve element therein, and a distance between said heat generating portion and the surface of said slider opposing to the magnetic disk is as equal to or greater than 60 times and equal to or less than 300 times as a size of said magneto-resistive element in a normal direction of the surface of said slider opposing to the magnetic disk.

6. A magnetic head slider, as described in the claim 5, wherein the surface of said slider opposing to the magnetic disk builds up an air-bearing surface.

7. A magnetic head slider, as described in the claim 1, wherein said heat generating portion is made of a metal thin-film resistor, having a resistance value being equal to or greater than 20 Ω and equal to or less than 125 Ω.

8. A magnetic disk device, comprising:
a magnetic disk;
a recording element for recording information on a magnetic disk;
a reproducing element for reproducing information from the magnetic disk;
a slider for mounting thereon said recording element and said reproducing element, disposed opposing the magnetic disk; and
a heat generating portion provided on said slider, for thermally expanding a vicinity of at least said reproducing element, wherein
said heat generating portion and said reproducing element are disposed, so that an end portion of said slider on a surface side opposing to the magnetic disk, in said heat generating portion, is located deeper than an end portion of said slider on a surface side opposing to the magnetic disk, in said reproducing element, and
wherein said recording element and said reproducing element are formed through laminating thin-films on a substrate, being disposed so that said heat generating portion is located on said substrate side with respect to said recording element and said reproducing element, in a normal direction of the substrate, i.e., in a direction of laminating the thin-films, and having a metal film(s) on one side or on both sides of said heat generating portion relating to said thin-film laminating direction, to be thermally expanded by means of said heat generating portion.

9. A magnetic disk device, as described in the claim 8, wherein said recording element and said reproducing element are constructed to be a single element.

10. A magnetic disk device, as described in the claim 8, wherein said recording element and said reproducing element are formed through laminating thin-films on a substrate, being disposed so that said heat generating portion locates on said substrate side with respect to said recording element and said reproducing element, in a normal direction of the substrate, i.e., in a direction of laminating the thin-films, and being provided with a layer made of a resin material between said heat generating portion and said substrate relating to said thin-film laminating direction.

11. A magnetic disk device, as described in the claim 8, wherein a distance between said heat generating portion and the surface of said slider opposing to the magnetic disk is equal to or greater than 10 μm and is equal to or less than 50 μm.

12. A magnetic disk device, as described in the claim 8, wherein said reproducing element is one, using a magneto-resistive element therein, and a distance between said heat generating portion and the surface of said slider opposing to the magnetic disk is as equal to or greater than 60 times and equal to or less than 300 times as a size of said magneto-resistive element in a normal direction of the surface of said slider opposing to the magnetic disk.

13. A magnetic disk device, as described in the claim 12, wherein the surface of said slider opposing to the magnetic disk builds up an air-bearing surface.

14. A magnetic disk device, as described in the claim 8, wherein said heat generating portion is made of a metal thin-film resistor, having a resistance value being equal to or greater than 20 Ω and equal to or less than 125 Ω.

* * * * *